United States Patent [19]

Baumann

[11] Patent Number: 4,537,913

[45] Date of Patent: Aug. 27, 1985

[54] METHOD OF PREPARING A UREA-FORMALDEHYDE COMBINATION FOAM THAT IS LOW IN FORMALDEHYDE

[75] Inventor: Heinz Baumann, Kleinniedesheim, Fed. Rep. of Germany

[73] Assignee: Schaum-Chemie W. Bauer GmbH & Co. KG, Fed. Rep. of Germany

[21] Appl. No.: 586,966

[22] Filed: Mar. 7, 1984

[30] Foreign Application Priority Data

Mar. 9, 1983 [DE] Fed. Rep. of Germany ....... 3308237

[51] Int. Cl.$^3$ ................................................ C08J 9/30
[52] U.S. Cl. ..................................... 521/107; 521/116; 521/120; 521/121; 521/125; 521/187; 521/188; 528/259; 528/260
[58] Field of Search ............... 521/188, 116, 121, 107, 521/120, 125; 528/259, 260

[56] References Cited

U.S. PATENT DOCUMENTS 2,559,891  7/1951  Meyer .................................. 521/128
3,231,525  1/1966  Kelly et al. ......................... 521/188
4,092,277  5/1978  Moore ................................ 521/188
4,225,680  9/1980  Williams ............................. 521/188

Primary Examiner—Morton Foelak
Attorney, Agent, or Firm—Keil & Weinkauf

[57] ABSTRACT

A U.F. foam that is diamensionally stable, but low in formaldehyde, was made by adding to a conventional solution of a urea formaldehyde resin precondensate, before foaming, up to 50% urea, relative to the solid resin substance, and one or several connecting agents from the group of sulfurous alkyl compounds, saturated monobasic carbonic acids, saturated and unsaturated dicarbonic acids, purine compounds, inorganic acids of the group of halogens and chalcogens, and their salts, phosphoric acids and their salts, alkali metal salts and alkaline earth metal salts, in such quantity and in such a way that the pH of the resulting solution remains above 7; and subsequently foaming the solution with a hardener/foaming-agent solution in the conventional manner.

2 Claims, No Drawings

METHOD OF PREPARING A UREA-FORMALDEHYDE COMBINATION FOAM THAT IS LOW IN FORMALDEHYDE

This invention relates to a method of preparing a urea-formaldehyde foam that is low in formaldehyde, by foaming a solution of a urea-formaldehyde resin precondensate with a solution of a hardener and a foaming agent while admixing additional urea.

Urea-formaldehyde resin plastic foams are prepared in a suitable apparatus by foaming with air a foaming-agent solution containing a hardener and by admixing a urea-formaldehyde resin precondensate to the preformed foam lamellae. The result is a final foam that does not expand subsequently and, when charged by the front hose of the apparatus at about 1.5 bars into arbitrarily shaped hollow spaces, hardens and dries.

A foam is produced when at least 10% solid parts are added to the foaming agent, such as when a 40% resin precondensate and a foaming agent consisting of at least 10% solid parts is used.

The invention may be applied to so-called "foam foaming" as well as "resin foaming" or in known apparatuses to which the components are supplied individually and then foamed (cf. H. Baumann, "Schaumstoff Isoschaum im Schmelztiegel der Praxis" (The Foaming Agent Isofoam in the Crucible of Practical Application), *Heinzun-Luftung-Haustechnik* 18 (1967), Page 17-19, as well as the above-mentioned *Urea Formaldehyde Resins*, page 192).

In resin foaming, the resin solution contains a neutral tenside part required for foaming. After the air foaming and shortly before the foam leaves the apparatus, the hardener is sprayed into this mixture. Bibliographical references exist with respect to the use of U.F. plastic foams; for example, see Baumann: "Fortschritte bei UF-Schaumkunststoffen-Nue Polykondensate und Schaumkunststoffe" (Advances in the Case of U.F. Plastic Foams-New Polycondensates and Plastic Foams) *Kunststoffe* 69 (1979), 440–443. Technically, U.F. resins have been produced on a large scale for over 50 years (Houben-Weyl, Vol. XIV/2 (1963) 319 et seq.).

In the following, the terms "urea-formaldehyde" and "U.F." will be used interchangeably.

U.F. plastic foams, while drying, which in the case of commercially available foams may take up to 28 days depending on the ambient temperature and on the air humidity, release into the air small quantities of formaldehyde which was dissolved in water and originates from, among others, short-chained methylol-containing groups which, under suitable conditions, may convert to formaldehyde with unpleasant odors resulting.

U.F. plastic foams, when compared to other insulating materials, have many advantages. For example, they are made of aqueous solutions and are not dependent on petroleum. They do not spread fires and they are in a low price range. A 40:1 base solution, such as 20:1 resin solution and 20:1 foaming-agent solution, results in 1,000:1 final foam. Expenditures for storage required for plate-type materials, therefore, are eliminated as well as high insurance costs. U.F. plastic foams are relatively inexpensive and are efficient insulating materials.

During the past two years, it has been suggested that the chemical formaldehyde released by U.F. plastic foams is harmful to health. However, it has been proven that these harmful effects are no higher than those of other substances, including food and flowers, some of which may also lead to allergies.

Although U.F. plastic foams have been processed without objection for over 30 years, the now and then occurring slight, formaldehyde odor is a technical problem that had to be solved.

As early as in 1939 it was suggested that the residual formaldehyde in the U.F. foam could be eliminated by using alcohols (German Pat. No. 729,029). Though slight, further reduction of formaldehyde is achieved by adding alcohols having four or more hydroxyl groups to the resin (German Pat. No. 1,054,232).

Adding fairly large quantities of urea to the foaming-agent solutions, which usually contain salts, particularly Na salts of aryl, alkyl or alkaryl sulphonic acids as foaming agents, was also tried. This, however, resulted in cloudiness or precipitation of the urea and decreased the resistance of the foam to pressure and abrasion.

The problem was addressed in U.S. Pat. No. 3,231,525, where instead of the Na salt of a sulphonic acid, the acid itself was used in the hardener/foaming-agent solution. In this manner, much larger quantities of urea can be dissolved in the foaming-agent solution, but the resulting foams are not dimensionally stable. They shrink and with respect to hydrothermal stress, do not meet technical standards.

In Baumann, U.S. Ser. No. 489,556, filed Apr. 4, 1983, it was disclosed that up to 96% urea could be dissolved in an approximately 10 to 30% aqueous extract of an alkyl, aryl or alkaryl sulphonic acid, that this solution could be mixed with a conventional hardener/foaming-agent solution comprising the Na salt of an alkyl, aryl or alkaryl sulphonic acid in an aqueous dilution conventionally used for foaming, and that this mixture, together with a urea-formaldehyde resin precondensate solution, could be foamed in the conventional manner.

It has also been known for a long time that additional amounts of urea could be mixed into a urea-formaldehyde resin precondensate and the resulting mixture could be foamed in a conventional manner. The following is stated in *Technische Information der BASF*, September 1981: "By adding technically pure urea, the free formaldehyde can be bound to a large extent. The quantity of urea depends on the respective usage. The standard value for the addition of urea can be assumed to be 10 to 12% (percent in weight), relative to the solid resin. Naturally, by means of larger additions, more formaldehyde can be bound, but it has to be examined whether the simultaneously occurring deterioration of the mechanical characteristics of the final foam can be accepted." It is followed by examples showing an addition of 12% and 16% urea, relative to the solid resin.

The amount of formaldehyde in a U.F. foam, the resin precondensate of which was mixed with about 12% urea, amounts to an average of 10–15 ppm, as measured by the formaldehyde Drager test tube, type 0.5. It varies according to the air humidity, the temperature, and age of the foam. Even many years later, 2 to 4 ppm formaldehyde can still be found in these foams, although it is no longer released into the outside air.

The Drager method is used because it can detect formaldehyde quickly, continuously and without large expenditures of labor.

By the addition of a quantity of urea above 12%, a U.F. foam can be prepared that is free, or low in formaldehyde and that has an instable lamellar structure. This is technically significant when the final foam must be ground into another phase—for example, for the production of powder for pharmaceutical or cosmetic use; for carpet-cleaning powders; for the preparation of fillers, oil-absorbing agents, catalysts, basic substances of pills, compact powders; or for certain uses in agriculture. These structurally instable foams can be ground immediately after the drying of the final foam in a ball triturator or an impeller breaker without having to be flaked first.

When less urea is added to a resin solution, it is known that the rise in temperature will be less, which in turn affects the reaction of the compounds. Interestingly enough, with this quantity of urea the lamellar bonding in the foam is obtained, but the setting time of the final foam is more than two minutes. During this long setting time, the lamellae of the foam collapse which results in non-homogeneity and decrease of the resistance to pressure. The setting time can be shortened by an increased addition of the hardener alone, but the general lamellar structure cannot be improved.

All previous attempts to eliminate the residual formaldehyde in foamed materials were not satisfactory because either residual formaldehyde was not sufficiently eliminated or the products obtained were unsatisfactory in regard to dimensional stability, formation of cracks, or fire resistance.

Many attempts to comprehensively improve the physical and/or chemical characteristics of the final U.F. foam have been made. Bibliographical references describe stabilizers, inductors, additives, aggregates, reagents, additive fillers, melting agents, etc. These attempts, however, have not achieved complete success.

It was the objective of the invention to introduce larger quantities of urea in order to obtain a U.F. foam releasing a low amount of formaldehyde and having a faster drying time, that nevertheless, is dimensionally stable, free of cracks, and resistant to pressure, abrasions and fire, i.e., a U.F. foam which, meets all technical requirements.

According to the invention, this objective is achieved by adding, to a conventional solution of a urea-formaldehyde resin precondensate, before foaming, up to 50% urea, relative to the solid resin substance, and one or several connecting agents from the group of sulfurous alkyl compounds, saturated monobasic carbonic acids, saturated and unsaturated dicarbonic acids, purine compounds, inorganic acids of the group of halogens and chalcogens, and their salts, phosphoric acids and their salts, alkali metal salts and alkaline earth metal salts, in such quantities so that the pH remains above 7, and foaming the resulting solution in a conventional manner with a hardener/foaming-agent solution.

Surprisingly, it was found that the lamellar structure of the foam is maintained, if in addition to a fairly large quantity of urea, other smaller quantities of certain compounds are dissolved in the resin solution. These compounds do not have a catalytic effect. They prevent a quantitative reaction of the urea and the low-molecular compounds, as proven by the decreasing reaction temperature. They also affect the stability of the lamellae and in that sense have a "connecting effect." Thus, they are called "connecting agents."

All inorganic or organic compounds are suitable as connecting agents which, when up to 50% urea, relative to the solid resin substance, is added, stabilize the lamellar structure of the final foam, largely prevent a separation of formaldehyde and result in a cohesive foam structure.

These connecting agents include sulfurous alkyl compounds, such as alkyl sulphides, sulphoxides, sulphones, alkylaryl or aryl, alkyl sulphonic acids; saturated monobasic carbonic acids, such as formic acid and acetic acid; saturated and unsaturated dicarbonic acids, such as oxalic acid, malonic acid, succinic acid, maleic acid and fumaric acid; purine compounds, such as uric acid and xanthine; inorganic acids and salts from the group of halogens, such as hydrochloric acid and chlorides, inorganic acids and salts from the group of chalcogens, such as sulfuric acid, thiosulfuric acid and salts; phosphoric acids and their salts; alkaline earth metal salts, such as calcium chloride, magnesium chloride, and magnesium sulfate; and alkali metal salts, such as sodium chloride and potassium chloride.

The use of inorganic acids as hardeners in U.F. resin precondensate solutions is known. However, it was found that when these acids are used in the resin solution in small quantities, no hardening takes place, or is delayed so much that the connecting effect of these connecting agents occurs beforehand.

For example, freshly prepared, commercially available U.F. urea solution with 10% additional urea, relative to the solid resin substance, has a pH of about 7.7 to 7.8 which increases after six days to about 8.00. If another 55 g (about 14% in weight, relative to the solid resin substance) are added to the fresh solution, the pH value rises to about 8.27. Because some of the connecting agents react as hardeners under acidic conditions, the quantity of the connecting agent should be proportioned in such a way that the pH value of the resin solution does not fall below 7.00.

Connecting agents may be added to the resin solution alone. It is also possible, however, to add to a foaming-agent solution some of those connecting agents which do not react as hardeners in the acid range. They should, if possible, not change the storage stability, and thus the viscosity of the resins over a time period of 6–8 weeks, unless the exact processing time of the solutions is known. One or several connecting agents may be added.

For every commercially available resin from different sources of supply, the quantity of the added urea and the quantity of the connecting agent should be determined empirically since the mole ratios of urea and formaldehyde in the production of resins and the quantities of urea that are added to these resins may have different effects.

In any case, the quantity of the connecting agent in comparison to that of the added urea is low. Although the connecting agents have no catalytic effect, their quantities may be described as "catalytic."

In the U.F. foam prepared according to the invention, the formaldehyde is not quantitatively eliminated, but in comparison to the previous U.F. plastic foams made of U.F. resins, containing additional urea, is reduced by 50 to 80%. This foam foams according to factory specifications, meets today's ecological requirements, no longer results in annoying odors and complies with the German Standard DIN 18 159, Part 2, A 1.

The additional costs caused by the addition of urea and connecting agents are also economically acceptable.

The foaming agents that are suitable for the preparation of U.F. foam, also called tensides, substances with surface-active characteristics, "surface-active" substances, surfactants, or detergents, predominantly on the basis of aryl and alkyl sulphonic acid salts, are described in detail by, among others, K. Lindner, "Tensides," three volumes, Wissenschaftliche Verlagsanstalt mbH, Stuttgart (1964); Volume 3 was published in 1971; G. Jawalek, "Tensides," Akademie Verlag, Berlin (1975); H. Stache "Tenside Pocket Edition," Hanser-Verlag, Munchen (1979); and in the manufacturers' texts and information sheets.

A preferred foaming agent is, for example, diisobutyl-naphthalene-sulphonic-acidic sodium.

A foaming agent solution that is ready to be sprayed consists, for example, of 20% diisobutyl-naphthalene-sulphonic-acidic sodium, 4% resorcin, 25% $H_3PO_4$ (of a strength of 85%) and 51% softened water. 45 ml of this extract are added to 956 ml water and the solution used for foaming is obtained.

Urea-formaldehyde precondensates (aminoplastic resins) have frequently been described in bibliographic references (Beat Meyer, "Urea Formaldehyde Resins" (1979), Addison-Wesley Publishing Company, Inc.). However, for the presentation of U.F. foam, only those resins are suitable that were formulated specifically for this purpose. Glue resins, for example, result in foams that are not waterproof and can lead to fungoid growth in the final foam.

Especially preferred, for example, is a 40% aqueous urea-formaldehyde resin precondensate that was prepared from urea and formaldehyde at a mole ratio of 1:1.2 in the known manner at 100° C., neutralized by means of NaOH to a pH value of approximately 7.0 and then cooled to room temperature.

All alkyl and aryl ureas may be used as the urea, such as monoalkyl-monoaryl ureas, dialkyl-diaryl ureas, trialkyl-triaryl ureas, tetraalkyl ureas and the derivatives of isourea.

Thiourea may also be used instead of the urea. All condensation reactions of the urea of thiourea are known, but in the literature, it has been described as cancer-causing. Thiourea may also be combined with urea.

Any other reagents, such as stabilizers, additives, fillers, and coloring substances, etc., can be added without otherwise affecting the U.F. foam if they have been carefully matched to the urea quantity and the connecting agent.

The following examples further explain the invention.

COMPARATIVE EXAMPLE 1

One liter of a commercially available 40% aqueous urea-formaldehyde resin precondensate solution that had been prepared by reacting urea and formaldehyde at a mole ratio of 1:1.2 in the known manner at 100° C., was mixed with 48 g, i.e., 12% in weight of urea, relative to the solid resin substance; the mixture was foamed in the known manner with a hardener/foaming-agent solution that had been prepared by diluting 45 ml of an extract consisting of 20% diisobutyl-naphthalene-sulphonic-acidic sodium, 4% resorcin, 25% $H_3PO_4$ (of a strength of 85%) and 51% softened water to 1 liter.

One liter of the fresh foam weighed 42 g. Its setting time was 35 seconds. Formaldehyde, measured by means of the 0.5 Drager tube in the foam, on the second day was 15 ppm and on the eighth day, 12 ppm.

The lamellar structure of the foam was relatively stable.

COMPARATIVE EXAMPLE 2

The procedure was identical to that described in Example 1 except that, instead of 48 g (12% in weight) of urea, 100 g (25% in weight) of urea were added.

It was noted that the temperature in the final foam increased by only 6° C.

The lamella bonding of the foam was nonhomogeneous and instable. Formaldehyde, measured by means of the 0.5 Drager tube in the foam, during the first three days was between only 0 and 0.5 ppm.

EXAMPLE 3

The procedure was identical to that of Example 1, except that 2.5 g magnesium chloride, and then 70 g (17.5% by weight) of prilled urea were dissolved in the resin solution while stirring.

One liter of the fresh foam weighed 40 g and the setting time was 10 seconds. Formaldehyde, measured as in Comparative Example 1, amounted to the following: 1st day–4 ppm; 8th day–3 ppm. The lamellar structure of the foam was homogeneous and stable.

EXAMPLE 4

The procedure was identical to that of Example 1, except that the resin solution was mixed, while stirring, with 60 g (15% in weight) of urea and subsequently with 8 ml of a 1% phosphoric acid.

One liter of the foam weighed 35 g (determined weight when dry: 14 kg/m$^3$). Formaldehyde, measured as in Comparative Example 1, amounted to the following: On the 1st day: 3 ppm; on the 8th day: 2 ppm.

The lamellar structure of the foam was homogeneous and stable.

EXAMPLE 5

The procedure was identical to that of Example 1, except that the resin solution was mixed with 80 g (20% in weight) of urea, and that the resin solution and the foaming-agent solution were mixed with 6 g of sodium chloride each.

One liter of the fresh foam weighed 50 g and the setting time was 45 seconds. Formaldehyde, measured as in Comparative Example 1, amounted to the following: on the 1st day: 2 ppm; on the 8th day: 2 ppm.

The lamellar structure of the foam was homogeneous and stable.

EXAMPLE 6

The procedure was identical to that of Example 1, except that the resin solution was mixed with 60 g (15% in weight) of urea and 4 ml of a 1% oxalic acid solution, and that 6 g oxalic acid were mixed in the foaming-agent solution.

One liter of the foam weighed 46 g and the setting time was 30 seconds. Formaldehyde, measured as in Comparative Example 1, amounted to the following: on the 1st day–3 ppm; on the 8th day–2 ppm.

The lamellar structure of the foam was homogeneous and stable.

EXAMPLE 7

The procedure was identical to that of Example 1, but the resin solution was mixed with 60 g (15% in weight) urea and that the resin solution and the foaming-agent solution were mixed with 5 ml each of a solution of 29 g magnesium sulfate in 100 ml of water.

One liter of the fresh foam weighed 39 g; the setting time was 30 seconds. Formaldehyde, measured as in Comparative Example 1, amounted to the following: on the 1st day-3.5 ppm; on the 8th day-3 ppm.

The lamellar structure of the foam was homogeneous and stable.

As the Examples demonstrate, the foams to which up to 12% in weight urea (relative to the weight of the solid resin substance) was added prior to foaming, have a relatively good, stable lamellar structure, but exhibit a relatively large quantity of free formaldehyde. On the other hand, foams to which more than 12% in weight urea was added have a low quantity of free formaldehyde but have a non-homogeneous and unstable lamellar structure.

The foams according to the invention, to which more than 12% in weight urea and a connecting agent were added simultaneously before foaming, exhibit a low amount of free formaldehyde as well as a satisfactory lamellar structure.

I claim:

1. A method of preparing a urea-formaldehyde combination foam that is low in formaldehyde which comprises:
   (a) adding to a conventional solution of a urea formaldehyde resin precondensate, before forming, up to 50% urea (relative to the solid resin substance) and one or several connecting agents from the group consisting of, formic acid, acetic acid, oxalic acid, malonic acid, succinic acid, maleic acid, fumaric acid, uric acid, xanthine, hydrochloric acid, sulfuric acid, thiosulfuric acid and phosphoric acid and their salts, calcium chloride, magnesium chloride, magnesium sulfate, sodium chloride and potassium chloride, said connecting agents being added in such quantity and in such a way that the pH of the resulting solution does not fall below 7; and then
   (b) foaming the resulting solution with a hardner-/foaming-agent solution in a conventional manner.

2. A method according to claim 1, wherein the connecting agents are from the group of magnesium chloride, sodium chloride, oxalic acid and phosphoric acid.

* * * * *